(12) United States Patent
Hong

(10) Patent No.: US 11,356,910 B2
(45) Date of Patent: Jun. 7, 2022

(54) METHOD AND DEVICE FOR MANAGING MEASUREMENT PARAMETERS OF CELL HANDOVER

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 15 days.

(21) Appl. No.: 16/642,018

(22) PCT Filed: Aug. 28, 2017

(86) PCT No.: PCT/CN2017/099360
§ 371 (c)(1),
(2) Date: Feb. 25, 2020

(87) PCT Pub. No.: WO2019/041111
PCT Pub. Date: Mar. 7, 2019

(65) Prior Publication Data
US 2020/0221357 A1 Jul. 9, 2020

(51) Int. Cl.
*H04W 36/00* (2009.01)
*H04B 7/185* (2006.01)
*H04W 36/08* (2009.01)

(52) U.S. Cl.
CPC .... *H04W 36/0085* (2018.08); *H04B 7/18506* (2013.01); *H04W 36/00837* (2018.08); *H04W 36/08* (2013.01)

(58) Field of Classification Search
CPC ....... H04W 36/0085; H04W 36/00837; H04W 36/08; H04W 36/0094; H04B 7/18506
See application file for complete search history.

(56) References Cited

U.S. PATENT DOCUMENTS

| 8,688,101 B1 | 4/2014 | Hayes et al. |
| 8,825,033 B1 | 9/2014 | Hayes et al. |
| 9,325,793 B1 | 4/2016 | Stone et al. |
| 2007/0165541 A1 | 7/2007 | Arpee |
| 2016/0029370 A1 | 1/2016 | Hayes et al. |
| 2016/0227460 A1 | 8/2016 | Hyslop |

(Continued)

FOREIGN PATENT DOCUMENTS

| CN | 104053197 A | 9/2014 |
| CN | 105594233 A | 5/2016 |

(Continued)

OTHER PUBLICATIONS

International Search Report in the international application No. PCT/CN2017/099360, dated May 31, 2018.

(Continued)

*Primary Examiner* — Marisol Figueroa
(74) *Attorney, Agent, or Firm* — Syncoda LLC; Feng Ma

(57) ABSTRACT

A method for managing measurement parameters of cell handover includes: acquiring a target parameter, the target parameter varying along with altitude and may be used for characterizing the parameter of the altitude at which an aircraft is located; determining a target measurement parameter of cell handover according to the target parameter; performing cell handover processing according to the target measurement parameter.

13 Claims, 13 Drawing Sheets

(56) References Cited

U.S. PATENT DOCUMENTS

| | | | |
|---|---|---|---|
| 2017/0064604 A1 | 3/2017 | Kakkad | |
| 2017/0208489 A1 | 7/2017 | Djordjevic et al. | |
| 2017/0295069 A1* | 10/2017 | Sweet, III | B64C 39/024 |
| 2018/0132225 A1 | 5/2018 | Hayes et al. | |
| 2019/0159192 A1 | 5/2019 | Hayes et al. | |
| 2019/0239134 A1 | 8/2019 | Hyslop | |
| 2020/0033849 A1* | 1/2020 | Yiu | G05D 1/0607 |
| 2020/0045504 A1 | 2/2020 | Hayes et al. | |
| 2020/0162977 A1* | 5/2020 | Lee | H04W 36/0088 |
| 2020/0314595 A1 | 10/2020 | Hayes et al. | |
| 2021/0014761 A1 | 1/2021 | Hyslop | |

FOREIGN PATENT DOCUMENTS

| | | | |
|---|---|---|---|
| CN | 105682158 A | 6/2016 | |
| CN | 106774432 A | 5/2017 | |
| CN | 107079365 A | 8/2017 | |
| CN | 108064453 A | 5/2018 | |
| EP | 3044977 A1 | 7/2016 | |
| WO | 2007009008 A2 | 1/2007 | |
| WO | 2016175934 A1 | 11/2016 | |

OTHER PUBLICATIONS

English translation of the Written Opinion of the International Search Authority in the international application No. PCT/CN2017/099360, dated May 31, 2018.

Supplementary European Search Report in the European application No. 17923253.3, dated Mar. 16, 2021.

Office Action of the Indian application No. 202047011761, dated Mar. 23, 2021.

3GPP TSG-RAN WG2 Meeting #99 R2-1708545, Berlin, Germany, Aug. 21-25, 2017; Agenda item: 9.4.4; Source: Huawei, HiSilicon; Title: Measurement Report Mechanism for Drones.

3GPP TSG-RAN WG2 Meeting #99 R2-1708544, Berlin, Germany, Aug. 21-25, 2017; Agenda item: 9.4.4; Source: Huawei, HiSilicon; Title: Analysis and Simulation of Handover Issues for Drones.

3GPP TSG-RAN WG2 Meeting #99 R2-1709463, Berlin, Germany, Aug. 21-25, 2017; Agenda Item: 9.4.4; Source: LG Electronics Inc.; Title: Handover Support for Aerial UE.

Second Office Action of the Chinese application No. 201780000913.5, dated Apr. 6, 2021.

* cited by examiner

METHOD AND DEVICE FOR MANAGING MEASUREMENT PARAMETERS OF CELL HANDOVER

CROSS-REFERENCE TO RELATED APPLICATION

The present application is a national stage of International Application No. PCT/CN2017/099360 filed on Aug. 28, 2017, the disclosure of which is hereby incorporated by reference in its entirety.

TECHNICAL FIELD

The present disclosure relates to the technical field of drones, and more particularly to a method and device for managing a measurement parameter for cell handover.

BACKGROUND

Along with technology development of drones, drones have played an important role in various fields, for example, aerial photography, express transportation, disaster relief and news report. After a drone accesses a cell and is in a connected state, if another cell is detected, and a signal of the another cell keeps being stronger than a signal of the presently-accessed cell by a threshold value within a preset time period (usually called TimeToTrigger), the drone performs cell handover processing and is handed over from the presently-accessed cell to the another cell.

SUMMARY

In order to solve the problem existing in a related art, a network connection management method, device and system are provided in the present disclosure. The technical solutions are implemented as follows.

In a first aspect, a method for managing a measurement parameter for cell handover is provided, which may include operations as follows.

A target parameter is acquired in a flight process. The target parameter is a parameter varying with an altitude and configurable to indicate the altitude of an aerial vehicle.

A target measurement parameter for cell handover is determined according to the target parameter.

Cell handover processing is performed according to the target measurement parameter.

Optionally, the target parameter may include one or more of a parameter on an altitude value, a parameter on the number of detected cells other than a presently-accessed cell, a parameter on the number of detected cells, other than the presently-accessed cell and neighbor cells of the presently-accessed cell, and a parameter on an increase speed of the number of detected cells.

Optionally, the method may further include an operation as follows.

A first notification message sent by a base station is received. The first notification message is used to instruct the aerial vehicle to detect the target parameter.

Optionally, the operation that the target measurement parameter for cell handover is determined according to the target parameter may include operations as follows.

A target regulation factor corresponding to the currently-acquired target parameter is determined according to pre-stored correspondences between target parameters and regulation factors.

A product of the target regulation factor and a pre-stored reference measurement parameter for cell handover is acquired to obtain the target measurement parameter for cell handover.

Optionally, the method may further include operations as follows.

A second notification message sent by the base station is received. The second notification message contains the reference measurement parameter and the correspondences between the target parameters and the regulation factors.

The correspondences and the reference measurement parameter are stored.

Optionally, the measurement parameter may include a TimeToTrigger.

In a second aspect, an aerial vehicle is provided, which may include a detection module, a determination module and a handover module, The detection module is configured to acquire a target parameter in a flight process. The target parameter is a parameter varying with an altitude and is able to indicate the altitude of the aerial vehicle.

The determination module is configured to determine a target measurement parameter for cell handover according to the target parameter.

The handover module is configured to perform cell handover processing according to the target measurement parameter.

Optionally, the target parameter may include one or more of a parameter on an altitude value, a parameter on the number of detected cells other than a presently-accessed cell, a parameter on the number of detected cells, other than the presently-accessed cell and neighbor cells of the presently-accessed cell, and a parameter on an increase speed of the number of detected cells.

Optionally, the aerial vehicle may further include a first receiving module.

The first receiving module is configured to receive a first notification message sent by a base station. The first notification message is used to instruct the aerial vehicle to detect the target parameter.

Optionally, the determination module may be configured to:

determine a target regulation factor corresponding to the currently-acquired target parameter according to pre-stored correspondences between target parameters and regulation factors; and acquire a product of the target regulation factor and a pre-stored reference measurement parameter for cell handover to obtain the target measurement parameter for cell handover.

Optionally, the aerial vehicle may further include a second receiving module and a storage module.

The second receiving module is configured to receive a second notification message sent by the base station. The second notification message contains the reference measurement parameter and the correspondences between the target parameters and the regulation factors.

The storage module is configured to store the correspondences and the reference measurement parameter.

Optionally, the measurement parameter may include a TimeToTrigger.

In a third aspect, an aerial vehicle is provided, which may include a processor and a memory having at least one instruction stored thereon. The instruction may be loaded and executed by the processor to implement the method for managing a measurement parameter for cell handover in the first aspect.

In a fourth aspect, a computer-readable storage medium having at least one instruction stored thereon is provided. The instruction is loaded and executed by a processor to implement the method for managing measurement parameters for cell handover in the first aspect.

The technical solutions provided by the embodiments of the present disclosure have the following beneficial effects.

In the embodiments of the present disclosure, the target parameter is acquired, the target parameter is a parameter varying with the altitude and configurable to indicate the altitude of the aerial vehicle. The target measurement parameter for cell handover is determined according to the target parameter. Cell handover processing is performed according to the target measurement parameter. In such a manner, a drone may have different measurement parameters at different altitudes. For example, based on values set in the correspondences, a relatively long TimeToTrigger is obtained when the drone flies at a relatively high altitude, which avoids frequent cell handover, thereby reducing a failure rate of data transmission.

BRIEF DESCRIPTION OF THE DRAWINGS

In order to describe the technical solutions in the embodiments of the present disclosure more clearly, the accompanying drawings required to be used for descriptions about the embodiments will be simply introduced below. It is apparent that the accompanying drawings described below only illustrate some embodiments of the present disclosure. Those skilled in the art may further obtain other accompanying drawings according to these accompanying drawings without creative work.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

A method for managing a measurement parameter for cell handover is provided according to an exemplary embodiment of the present disclosure. The method may be implemented by an aerial vehicle. The aerial vehicle may be an unmanned helicopter, an unmanned airship and the like.

The aerial vehicle may include components such as a processor, a memory, a transceiver and a flight component. The processor may be a Central Processing Unit (CPU) and the like, and may be configured for related processing for calculation of a target measurement parameter. The transceiver may be configured to receive correspondences between target parameters and measurement parameters for cell handover sent by a base station and the like. The memory may be a Random Access Memory (RAM), a flash and the like, and may be configured to store received data, data required in a processing process, data generated in the processing process and the like, for example, the correspondences between the target parameters and the measurement parameters for cell handover. The flight component may include a motor, a propeller and the like. The motor is configured to provide flight power, and the propeller is configured to drive an airflow to implement flight of the aerial vehicle.

Figure 1:
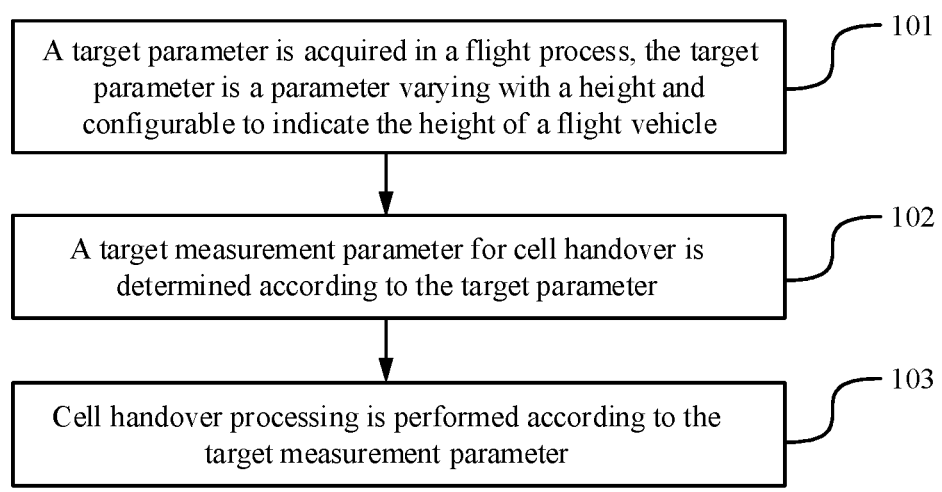
FIG. 1 is a flow chart showing a method for managing a measurement parameter for cell handover according to an embodiment of the present disclosure.

A method for managing a measurement parameter for cell handover is provided according to an embodiment of the present disclosure. As shown in FIG. 1, the method includes steps as follows.

In step 101, a target parameter is acquired in a flight process. The target parameter is a parameter varying with an altitude and configurable to indicate the altitude of an aerial vehicle.

In implementation, the aerial vehicle detects the target parameter in the flight process to acquire the target parameter, for subsequently determining a measurement parameter for cell handover.

In step 102, a target measurement parameter for cell handover is determined according to the target parameter.

The measurement parameter for cell handover is used to determine cell handover. When a device (the aerial vehicle or another terminal) detects that signal strength of a cell meets a cell handover condition in a time period, and a duration of the time period reaches the measurement parameter, cell handover is performed.

In implementation, the aerial vehicle, after acquiring the target parameter, determines the target measurement parameter for cell handover according to the target parameter.

In step 103, cell handover processing is performed according to the target measurement parameter.

In implementation, the aerial vehicle, after determining the target measurement parameter, judges whether the aerial vehicle is required to perform cell handover and performs related processing.

Figure 2:
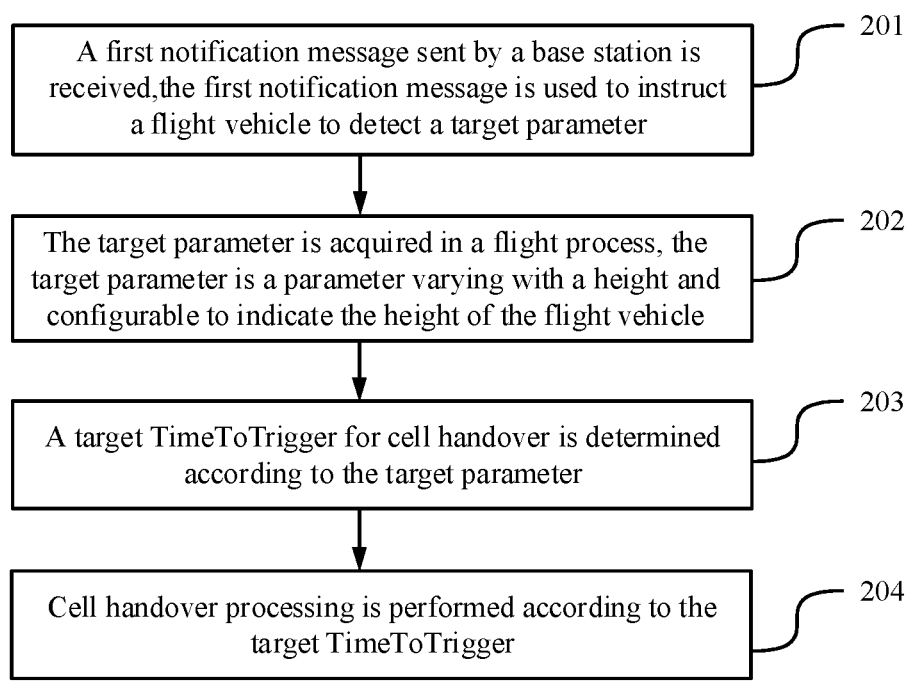
FIG. 2 is a flow chart showing a method for managing a measurement parameter for cell handover according to an embodiment of the present disclosure.

A method for managing a measurement parameter for cell handover is provided according to an embodiment of the present disclosure. A measurement parameter may be a TimeToTrigger, a Hysteresis parameter (Hys) or the like. The TimeToTrigger is taken as an example of the measurement parameter in the embodiment, to describe the solution in detail. The other cases for the method are similar to the case for the TimeToTrigger, and will not be described repeatedly in the embodiment anymore. As shown in FIG. 2, the method for managing a measurement parameter for cell handover may include the following steps.

In step 201, a first notification message sent by a base station is received. The first notification message is used to instruct an aerial vehicle to detect a target parameter.

Figure 3:
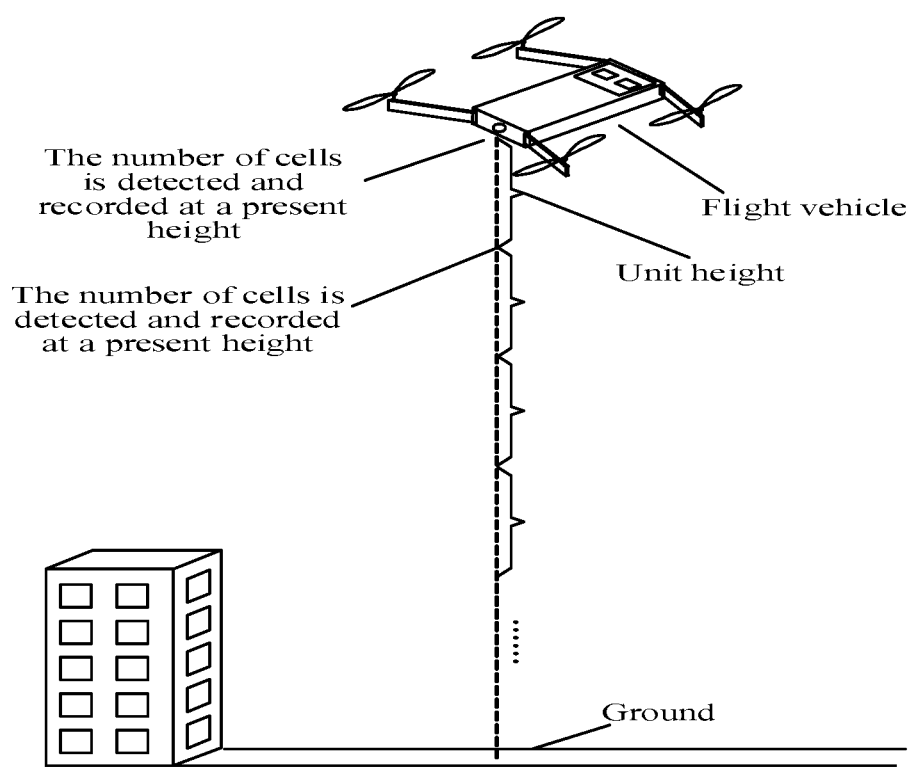
FIG. 3 is a schematic diagram illustrating a method for a managing measurement parameter for cell handover according to an embodiment of the present disclosure.

In implementation, the base station may record in advance the target parameter which is to be detected by the aerial vehicle, and a parameter used as the target parameter may be pre-configured by a technician. After the aerial vehicle accesses the base station, the base station sends the first notification message to the aerial vehicle, as shown in FIG. 3, for example, Radio Resource Control (RRC) signaling. The first notification message instructs the aerial vehicle to detect the target parameter. The aerial vehicle, after receiving the first notification message, parses the first notification message to obtain the type of the target parameter to be detected by the aerial vehicle, and then the aerial vehicle may measure the target parameter to obtain the target parameter.

In step 202, the target parameter is acquired in a flight process. The target parameter is a parameter varying with an altitude and configurable to indicate the altitude of the aerial vehicle.

In implementation, when a user is intended to control the aerial vehicle to take off, the user may place the aerial vehicle stably, turn on a switch of the aerial vehicle, operate a remote controller to control the aerial vehicle to fly, and control a flight direction of the aerial vehicle. The aerial vehicle, after being turned on and receiving a signal of the base station, may further establish a connection with the base station. The aerial vehicle, after successfully accessing the base station, may detect the parameter at a preset detection period. Every time when the preset detection period is reached, the aerial vehicle may measure the target parameter, for subsequently determining the TimeToTrigger for cell handover.

Optionally, the target parameter may be one or more of a parameter on an altitude value, a parameter on the number of detected cells other than a presently-accessed cell, a parameter on the number of detected cells, other than the presently-accessed cell and neighbor cells thereof, and a parameter on an increase speed of the number of detected cells.

The parameter on the increase speed of the number of cells refers to an increment of the number of detected cells per altitude unit rise of the aerial vehicle.

In implementation, the target parameter may be represented in many manners.

Figure 4A:
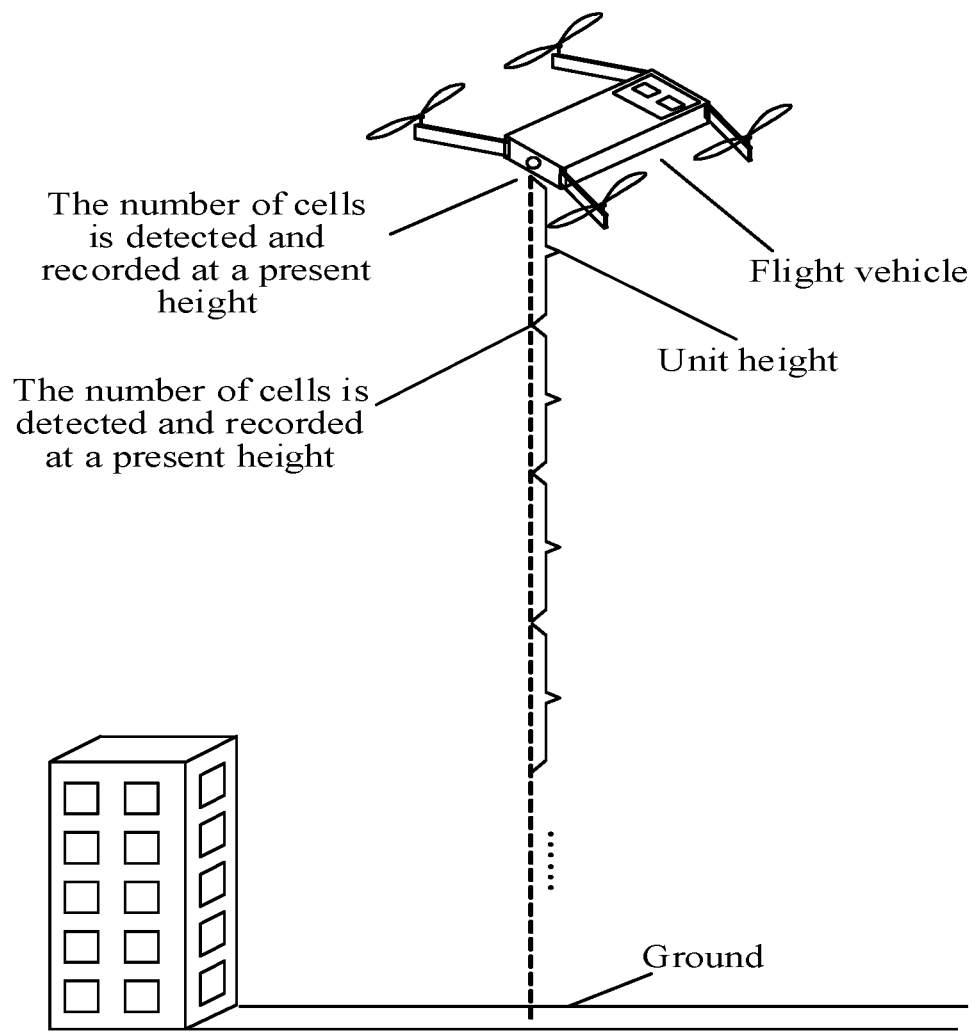
FIG. 4A is a schematic diagram illustrating management for a measurement parameter for cell handover according to an embodiment of the present disclosure.

In a first condition that the target parameter is a parameter on an altitude value, the operation that the aerial vehicle detects the target parameter may include an operation as follows. The aerial vehicle may measure an altitude (in meters) at a present position through a laser ranging or 3 Dimensions (3D) Global Positioning System (GPS), as shown in FIG. 4A, to obtain a value as the detected target parameter.

Figure 4B:
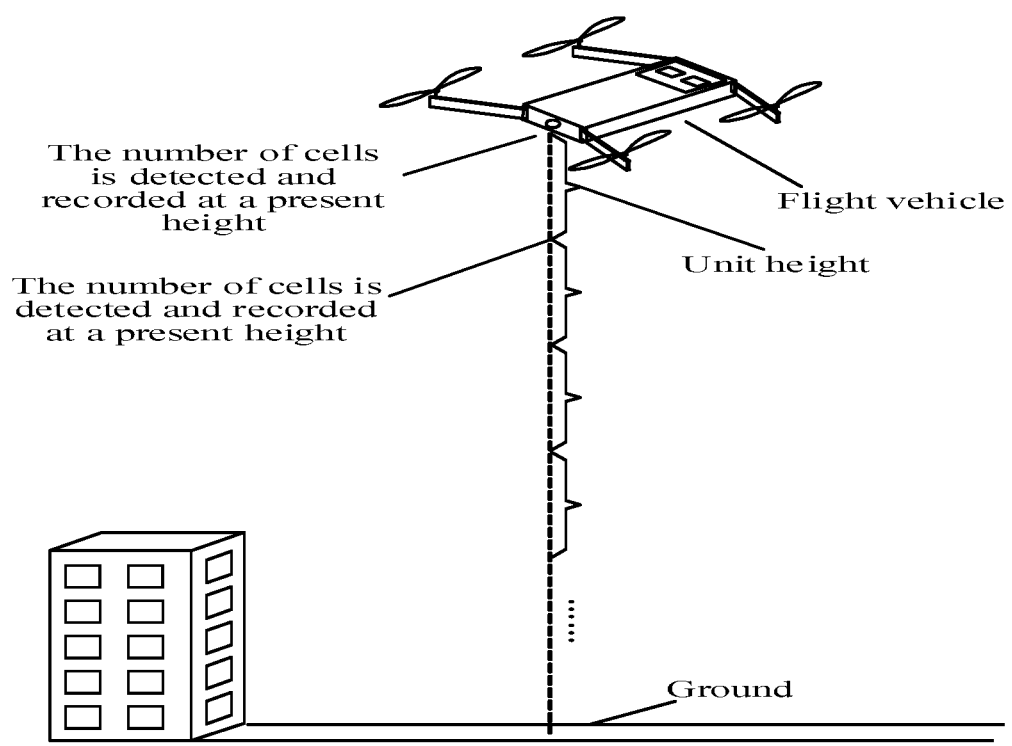
FIG. 4B is a schematic diagram illustrating management for a measurement parameter for cell handover according to an embodiment of the present disclosure.

In a second condition that the target parameter is the parameter on the number of detected cells other than the presently-accessed cell, the operation that the aerial vehicle detects the target parameter may include an operation as follows. The base station may periodically broadcast a synchronization signal and a secondary synchronization signal to each cell. The synchronization signal and the secondary synchronization signal contain a cell identifier. Since signal coverage of different cells may overlap, signals of multiple cells may be detected by the aerial vehicle at the same time (within a relatively short preset time). The aerial vehicle acquires the cell identifier from each presently-detected signal, as shown in FIG. 4B, and calculates the number of cell identifiers of cells other than the presently-accessed cell as the detected target parameter. Alternatively, when the number of cell identifiers is calculated, only the number of cell identifiers carried in messages having signal strength greater than a preset threshold value is calculated.

In a third condition that the target parameter is the parameter on the number of detected cells, other than the presently-accessed cell and the neighbor cells of the presently-accessed cell, the operation that aerial vehicle detects the target parameter may include operations as follows. A server may obtain the cell identifier acquired by the aerial vehicle from each presently-detected message according to a processing manner in the above second condition, then acquire a list of neighbor cells of the currently-accessed cell, compare all the cell identifiers detected by the aerial vehicle with cell identifies in the list of the neighbor cells, remove a cell identifier in the list of the neighbor cells and the cell identifier of the presently-accessed cell from all the cell identifiers, calculate the number of remaining cell identifiers as the detected target parameter. The list of neighbor cells of the currently-accessed cell may be pre-stored by the aerial vehicle, and may also be sent to the aerial vehicle by the base station and then received and stored by the aerial vehicle.

Figure 4C:
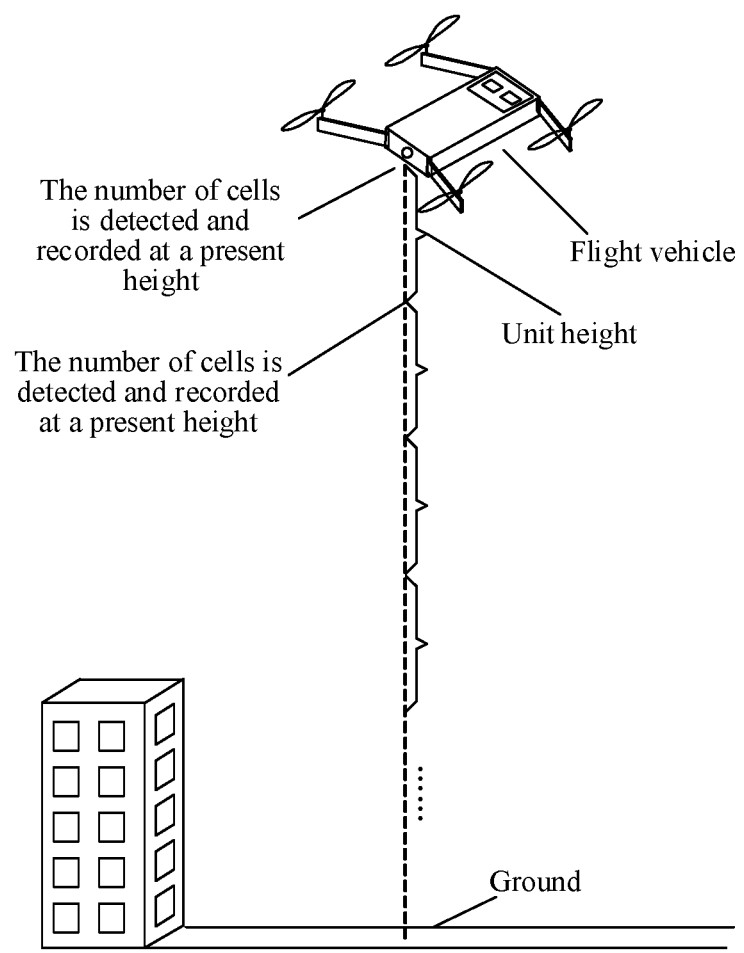
FIG. 4C is a schematic diagram illustrating management for a measurement parameter for cell handover according to an embodiment of the present disclosure.

In a fourth condition that the target parameter is the parameter on an increase speed of the number of detected cells, the operation that the aerial vehicle detects the target parameter may include operations as follows. As shown in FIG. 4C, the server may detect the altitude of the aerial vehicle according to a processing manner in the first condition. Every time when the aerial vehicle rises by a unit altitude, the aerial vehicle obtains the number of cells that may be detected at the same time in a processing manner similar to the above second condition, records the number of cells, and acquires the number of cells detected at the previous unit altitude, further calculates an increment of the number of cells after rising by the unit altitude, and divides the increment by the unit altitude to obtain an increase speed as the detected target parameter.

In the embodiment of the present disclosure, one or a combination of the above conditions may be used, that is, the target parameter may be any one or more of the above conditions.

In step 203, a target TimeToTrigger for cell handover is determined according to the target parameter.

The TimeToTrigger for cell handover is configured to determine cell handover. When a device (the aerial vehicle or another terminal) detects that signal strength of a cell always meets a cell handover condition within a time period, and a duration of the time period reaches the TimeToTrigger, cell handover is performed. In correspondences, for the condition that the target parameter is the parameter on the altitude value, the TimeToTrigger increases with an increase of the altitude; in the condition that the target parameter is the parameter on the number of detected cells other than the presently-accessed cell, the TimeToTrigger increases with an increase of the number; for the condition that the target parameter is the parameter on the number of detected cells, other than the presently-accessed cell and the neighbor cells thereof, the TimeToTrigger increases with an increase of the number; and for the condition that the target parameter is the parameter on an increase speed of the number of detected cells, the TimeToTrigger increases with an increase of the increase speed.

Figure 5:
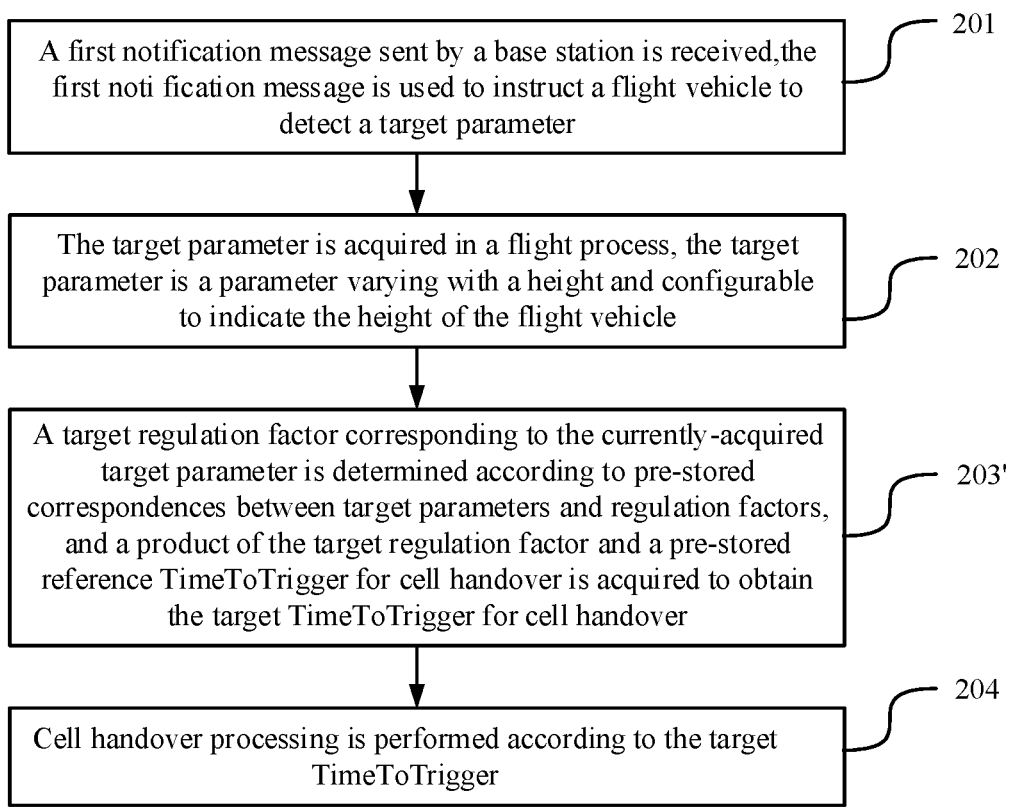
FIG. 5 is a flow chart showing a method for managing a measurement parameter for cell handover according to an embodiment of the present disclosure.

Optionally, as shown in FIG. 5, the method includes step 203', in which, a target regulation factor corresponding to the currently-acquired target parameter is determined according to pre-stored correspondences between target parameters and regulation factors; and a product of the target regulation factor and a pre-stored reference TimeToTrigger for cell handover is acquired to obtain the target TimeToTrigger for cell handover.

In implementation, reference TimeToTrigger may be preset by the technician, or may be arbitrarily set based on a practical condition. For example, the reference TimeToTrigger may be set in consideration of a cell density. In addition, correspondences between the target parameters and the regulation factors may also be preset by the technician, and may be stored in form of a table. A value of the regulation factor may be arbitrarily set based on the practical condition, and may be set in consideration of the selected target parameter. The reference TimeToTrigger and the correspondences table may be directly stored in a memory of the aerial vehicle, and may also be sent to the aerial vehicle by the base station and stored in the aerial vehicle. In the above correspondences, for the condition that the target parameter is the parameter on the altitude value, the regulation factor increases with an increase of the altitude; for the condition that the target parameter is the parameter on the number of detected cells other than the presently-accessed cell, the regulation factor increases with an increase of the number; for the condition that the target parameter is the parameter on the number of detected cells, other than the presently-accessed cell and the neighbor cells thereof, the regulation factor increases with an increase of the number; and for the condition that the target parameter is the parameter on the increase speed of the number of detected cells, the regulation factor increases with an increase of the increase speed.

The aerial vehicle, after detecting the target parameter, search the correspondence table for a regulation factor (i.e., the target regulation factor) corresponding to the value. The target regulation factor is multiplied by the reference TimeToTrigger to obtain a product as the target TimeToTigger.

For example, the preset reference TimeToTrigger is 1,024 ms, and the correspondence table of the target parameters and the regulation factors is shown in Table 1.

TABLE 1

| Target parameter | Regulation factor |
|---|---|
| 100 | 1 |
| 200 | 2 |
| 300 | 3 |
| 400 | 4 |

When the target parameter is the parameter on the altitude value and the aerial vehicle detects that the altitude is 200 meters, it may be learned according to Table 1 that the regulation factor corresponding to the target parameter is 2 when the target parameter is 200 meters, and the regulation factor of 2 is multiplied by the reference TimeToTrigger 1,024 ms, 2×1024 ms=2048 ms, to obtain 2048 ms. Therefore, it may be learned that the target TimeToTrigger corresponding to the present position of the aerial vehicle is 2,048 ms.

For another example, the preset reference TimeToTrigger is 512 ms, and the correspondence table between the target parameters and the regulation factors is shown in Table 2.

TABLE 2

| Target parameter | Regulation factor |
|---|---|
| 5 | 1 |
| 10 | 2 |
| 15 | 3 |
| 20 | 4 |

When the target parameter is the parameter on the number of detected cells other than the presently-accessed cell and the aerial vehicle detects that the number of detected cells is 15, it may be learned according to Table 2 that the regulation factor corresponding to the target parameter is 3 when the target parameter is 15, and the regulation factor 3 is multiplied by the reference TimeToTrigger 512 ms, 3×512 ms=1536 ms, to obtain 1536 ms. Therefore, it may be learned that the target TimeToTrigger corresponding to the present position of the aerial vehicle is 1,536 ms.

Figure 6:
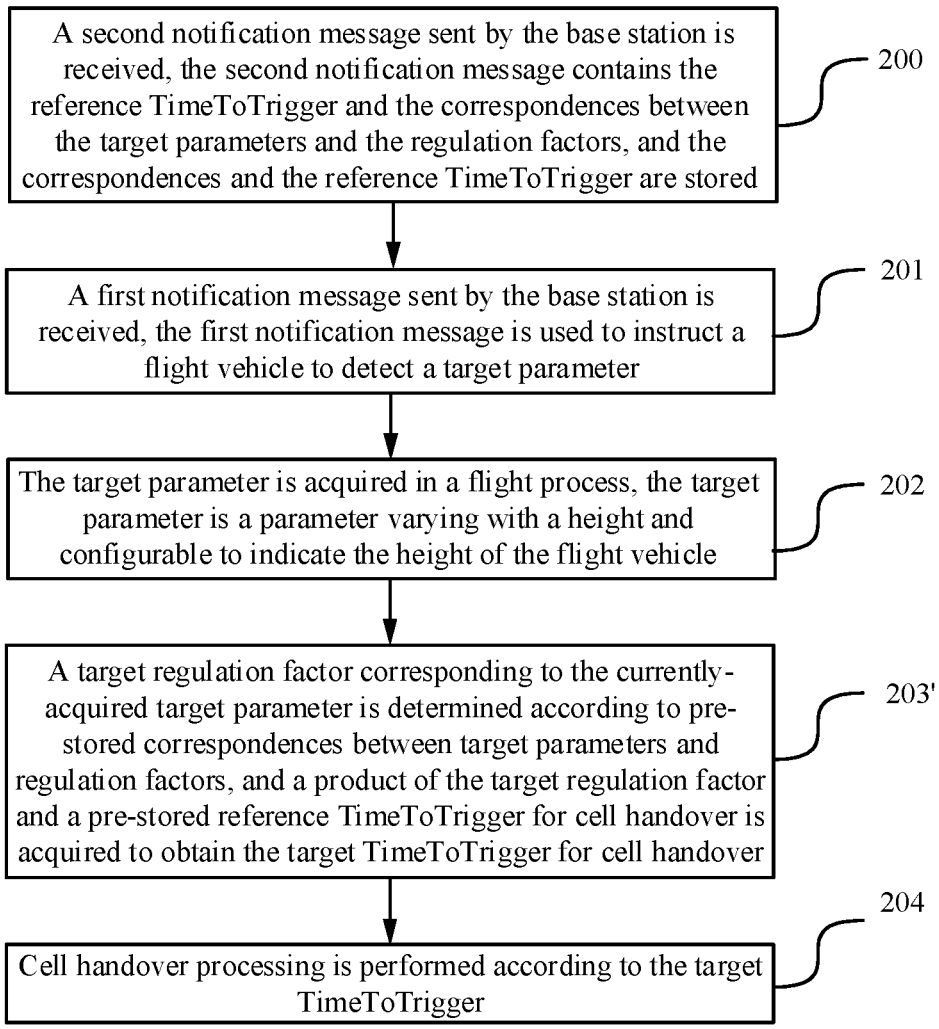
FIG. 6 is a flow chart showing a method for managing a measurement parameter for cell handover according to an embodiment of the present disclosure.

Optionally, as shown in FIG. 6, the method further includes step 200, in which, a second notification message sent by the base station is received, the second notification message contains the reference TimeToTrigger and the correspondences between the target parameters and the regulation factors, and the correspondences and the reference TimeToTrigger are stored.

The second notification message and the first notification message may be the same message, and may also be different messages.

In implementation, correspondences between the target parameters and the regulation factors may be preset by the technician, and be stored in the base station in form of a table. In addition, the reference TimeToTrigger may also be preset by the technician, and be stored in the base station. When the aerial vehicle accesses the base station, the base station may send the second notification message to the aerial vehicle, the second notification message contains the correspondences and the reference TimeToTrigger. The aerial vehicle, after receiving the second notification message sent by the base station, stores the reference TimeToTrigger and the correspondences between the target parameters and the regulation factors and in the second notification message, for subsequently calculating the target TimeToTrigger.

In step 204, cell handover processing is performed according to the target TimeToTrigger.

Figure 7:
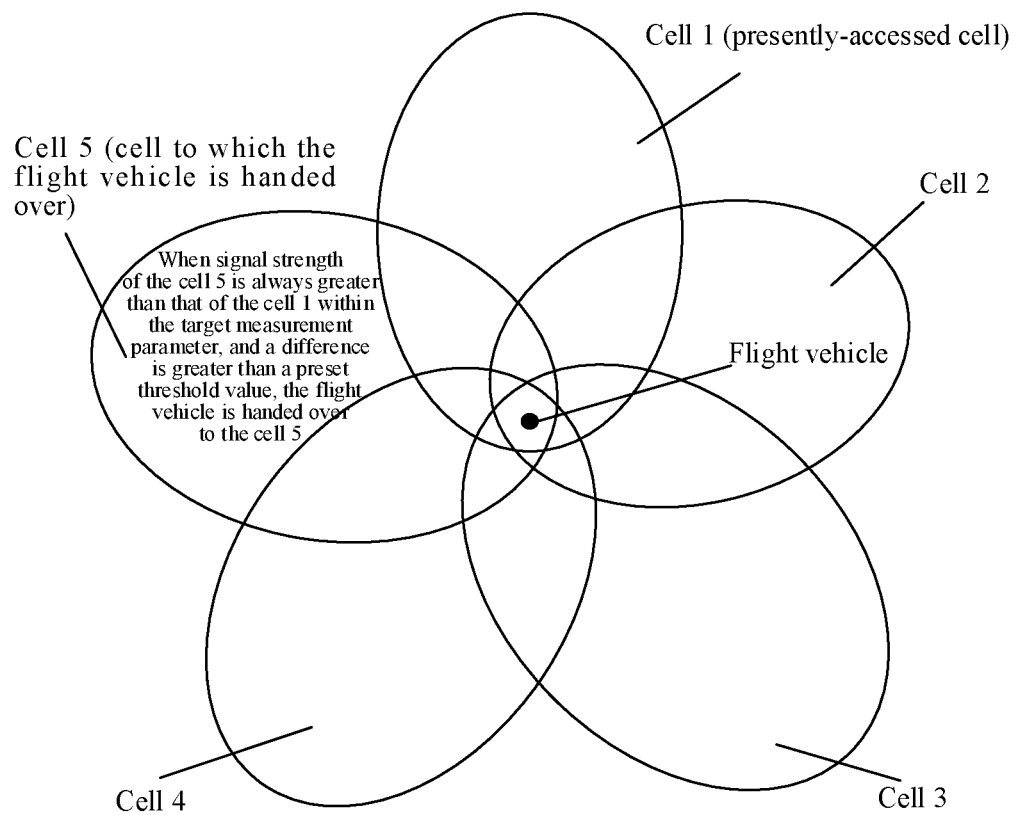
FIG. 7 is a schematic diagram illustrating management for a measurement parameter for cell handover according to an embodiment of the present disclosure.

In implementation, the aerial vehicle, after determining the target TimeToTrigger, stores the target TimeToTrigger. If the aerial vehicle detects that a difference between signal strength of a cell and signal strength of the presently-accessed cell is greater than a preset threshold value, and a duration in which the difference is kept greater than the preset threshold value reaches the target TimeToTrigger, a drone starts executing cell handover processing and is handed over from the presently-accessed cell to the cell having relatively high signal strength, as shown in FIG. 7. A value of the preset threshold value may range from 5 dBm to 20 dBm. For example, the preset threshold value is 10 dBm.

In the embodiment of the present disclosure, the target parameter is acquired, the target parameter is a parameter varying with the altitude and configurable to indicate the altitude of the aerial vehicle. The target TimeToTrigger for cell handover is determined according to the target parameter. Cell handover processing is performed according to the target TimeToTrigger. In such a manner, the drone may have different TimeToTrigger at different altitudes. Based on values set in the correspondences, a relatively long TimeToTrigger is obtained when the drone flies at a relatively high altitude, which avoids frequent cell handover, thereby reducing a failure rate of data transmission.

Figure 8:
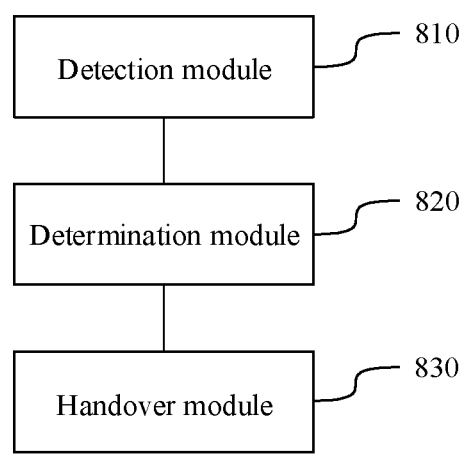
FIG. 8 is a schematic diagram illustrating an aerial vehicle according to an embodiment of the present disclosure.
Figure 9:
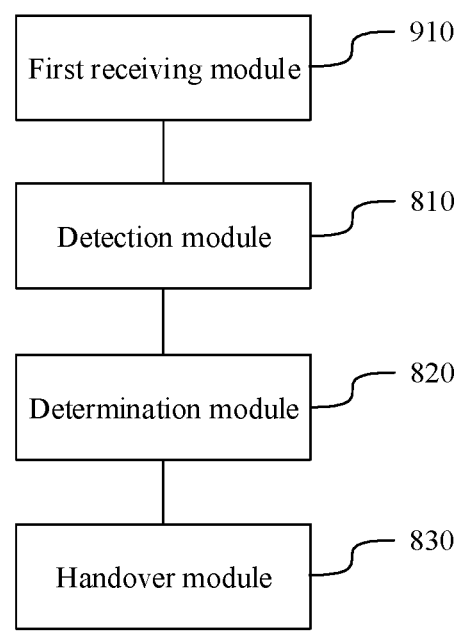
FIG. 9 is a schematic diagram illustrating an aerial vehicle according to an embodiment of the present disclosure.
Figure 10:
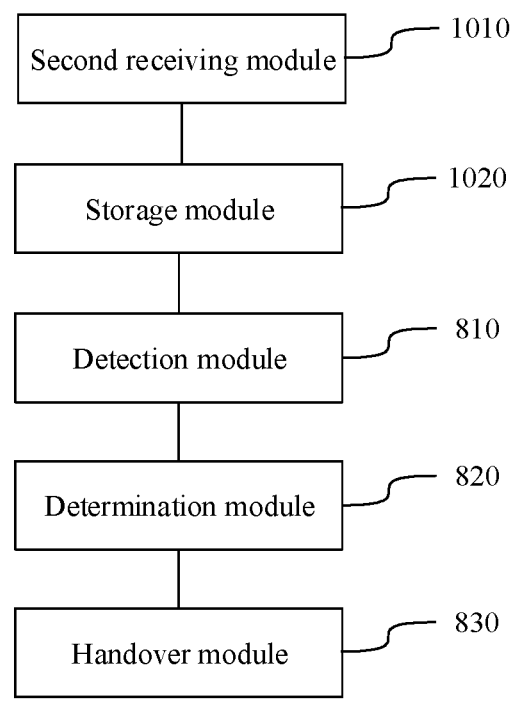
FIG. 10 is a schematic diagram illustrating an aerial vehicle according to an embodiment of the present disclosure.

Based on the same inventive concept, an aerial vehicle is further provided according to an embodiment of the present disclosure. As shown in FIG. 8, the aerial vehicle includes a detection module 810, a determination module 820 and a first storage module 830.

The detection module 810 is configured to acquire a target parameter in a flight process. The target parameter is a parameter varying with an altitude and configurable to indicate the altitude of the aerial vehicle.

The determination module 820 is configured to determine a target TimeToTrigger for cell handover according to the target parameter.

The handover module 830 is configured to perform cell handover processing according to the target TimeToTrigger.

Optionally, the target parameter may include one or more of a parameter on an altitude value, a parameter on the number of detected cells other than a presently-accessed cell, a parameter on the number of detected cells, other than the presently-accessed cell and neighbor cells of the presently-accessed cell, and a parameter on an increase speed of the number of detected cells.

Optionally, the aerial vehicle further includes a first receiving module 910.

The first receiving module 910 is configured to receive a first notification message sent by a base station. The first notification message is configured to instruct the aerial vehicle to detect the target parameter.

Optionally, the determination module 820 is configured to:

determine a target regulation factor corresponding to the currently-acquired target parameter according to pre-stored correspondences between target parameters and regulation factors; and acquire a product of the target regulation factor and a pre-stored reference TimeToTrigger for cell handover to obtain the target TimeToTrigger for cell handover.

Optionally, the aerial vehicle further includes a second receiving module 1010 and a storage module 1020.

The second receiving module 1010 is configured to receive a second notification message sent by the base station. The second notification message contains the reference TimeToTrigger and the correspondences between the target parameters and the regulation factors.

The storage module 1020 is configured to store the correspondences and the reference TimeToTrigger.

Optionally, a measurement parameter includes a TimeToTrigger.

In the embodiment of the present disclosure, the target parameter is acquired, the target parameter is a parameter varying with the altitude and configurable to indicate the altitude of the aerial vehicle. The target measurement parameter for cell handover is determined according to the target parameter. Cell handover processing is performed according to the target measurement parameter. In such a manner, the drone may have different measurement parameters at different altitudes. Based on values set in the correspondences, a relatively long measurement parameter is obtained when the drone flies at a high altitude, which avoids frequent cell handover, thereby reducing a failure rate of data transmission.

It is to be noted that, when managing the measurement parameter for cell handover, the aerial vehicle provided in the above embodiment is only exemplified with division of abovementioned functional modules, and during a practical application, the abovementioned functions may be allocated to be implemented by different functional modules according to a requirement. That is, an internal structure of a device is divided into different functional modules to implement all or a part of the functions described above. In addition, the aerial vehicle provided in the above embodiment has the same concept as the embodiment of the method for managing the measurement parameter for cell handover, and reference may be made to the method embodiment for details of an implementation process of the aerial vehicle, which is not described herein repeatedly anymore.

Another exemplary embodiment of the present disclosure illustrates a structure diagram of an aerial vehicle. The aerial vehicle may be a cellular network drone and the like.

Figure 11:
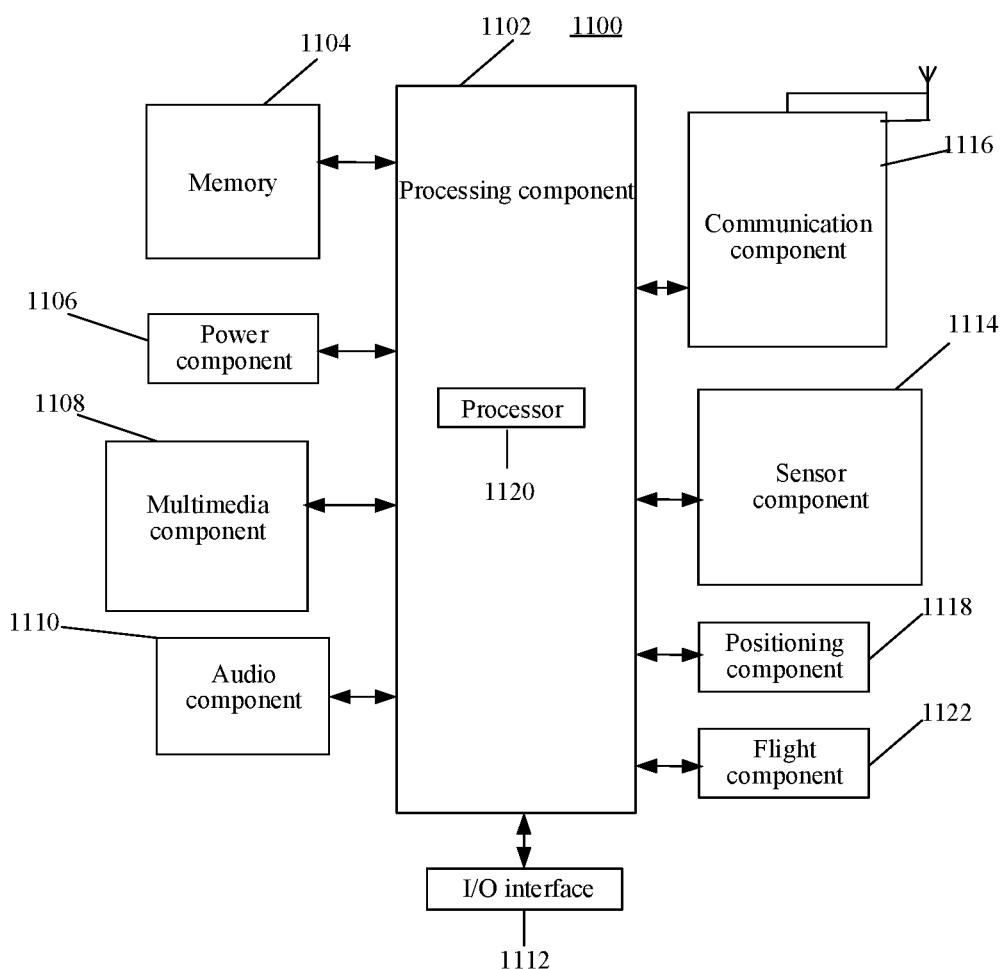
FIG. 11 is a structure diagram of an aerial vehicle according to an embodiment of the present disclosure.

Referring to FIG. 11, the aerial vehicle 1100 may include one or more of the following components: a processing component 1102, a memory 1104, a power component 1106, a multimedia component 1108, an audio component 1110, an Input/Output (I/O) interface 1112, a sensor component 1114, a communication component 1116, a positioning component 1118 and a flight component 1122.

The processing component 1102 typically controls overall operations of the aerial vehicle 1100, such as the operations associated with display, telephone calls, data communications, camera operations and recording operations. The processing component 1102 may include one or more processors 1120 to execute instructions to perform all or a part of the steps in the abovementioned method. Moreover, the processing component 1102 may include one or more modules which facilitate interaction between the processing component 1102 and the other components. For instance, the processing component 1102 may include a multimedia module to facilitate interaction between the multimedia component 1108 and the processing component 1102.

The memory 1104 is configured to store various types of data to support the operation of the aerial vehicle 1100. Examples of such data include address book data, phone book data, messages, pictures, videos or the like for any application programs or methods operated on the aerial vehicle 1100. The memory 1104 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory and a magnetic or optical disk.

The power supply component 1106 supplies power for various components of the aerial vehicle 1100. The power supply component 1106 may include a power management system, one or more power supplies, and other components associated with generation, management and distribution of power for the aerial vehicle 1100.

In some embodiments, the multimedia component 1108 includes a front camera and/or a rear camera. The front camera and/or the rear camera may receive external multimedia data when the aerial vehicle 1100 is in an operation mode, such as a photographing mode or a video mode. Each of the front camera and the rear camera may be a fixed optical lens system or have focusing and optical zooming capabilities.

The audio component 1110 is configured to output and/or input an audio signal. For example, the audio component 1110 includes a Microphone (MIC). The MIC is configured to receive an external audio signal when the audio output equipment 1100 is in the operation mode, such as a call mode, a recording mode and a voice recognition mode. The received audio signal may further be stored in the memory 1104 or sent through the communication component 1116.

The I/O interface 1112 provides an interface between the processing component 1102 and a peripheral interface module, and the peripheral interface module may be a keyboard, a click wheel, a button and the like. The button may include, but be not limited to: a home button, a volume button, a starting button and a locking button.

The sensor component 1114 includes one or more sensors configured to provide status assessment in various aspects for the aerial vehicle 1100. For instance, the sensor component 1114 may detect an on/off state of the aerial vehicle 1100 and relative positioning of components The components may be for example a display and small keyboard of the aerial vehicle 1100, the sensor component 1114 may further detect a change in a position of the aerial vehicle 1100 or a component of the aerial vehicle 1100, whether the user is in contact with the aerial vehicle 1100, orientation or acceleration/deceleration of the aerial vehicle 1100 and a change in temperature of the aerial vehicle 1100. The sensor component 1114 may include a proximity sensor configured to detect presence of a nearby object without any physical contact. The sensor component 1114 may also include a light sensor, such as a complementary metal oxide semiconductor (CMOS) or charge coupled device (CCD) image sensor, which is applied for imaging. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the aerial vehicle 1100 and another device. The aerial vehicle 1100 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 1116 receives a broadcast signal or broadcasts associated information from an external broadcast management system through a broadcast channel. In an exemplary embodiment, the communication component 1116 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

The positioning component 1118 is used by the aerial vehicle 1110 to determine position coordinates, and may be implemented by a GPS or a Beidou satellite positioning system.

The flight component 1122 may include a motor, a propeller and the like, and is configured to provide flight power for the aerial vehicle 1110.

In an exemplary embodiment, the aerial vehicle 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic components, to execute the abovementioned method.

In an exemplary embodiment, a non-transitory computer-readable storage medium including instructions is further provided, such as the memory 1104 including instructions. The instructions may be executed by the processor 1120 of the aerial vehicle 1100 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

A non-transitory computer-readable storage medium is provided according to yet another embodiment of the present disclosure. Instructions in the storage medium, when being executed by a processor of an aerial vehicle, enable the aerial vehicle to:

acquire a target parameter in a flight process, the target parameter is a parameter varying with an altitude and configurable to indicate the altitude of the aerial vehicle.

determine a target measurement parameter for cell handover according to the target parameter.

perform cell handover processing according to the target measurement parameter.

Optionally, the target parameter may include one or more of a parameter on an altitude value, a parameter on the number of detected cells other than a presently-accessed cell, a parameter on the number of detected cells, other than the presently-accessed cell and neighbor cells thereof, and a parameter on an increase speed of the number of detected cells.

Optionally, the method further includes enabling the device to:

receive a first notification message sent by a base station, the first notification message is used to instruct the aerial vehicle to detect the target parameter.

Optionally, the operation of determining the target measurement parameter for cell handover according to the target parameter includes operations of:

determining a target regulation factor corresponding to the currently-acquired target parameter according to pre-stored correspondences between target parameters and regulation factors; and acquiring a product of the target regulation factor and a pre-stored reference measurement parameter for cell handover, to obtain the target measurement parameter for cell handover.

Optionally, the method further includes operations of:

receiving a second notification message sent by the base station, the second notification message contains the reference measurement parameter and the correspondences between the target parameters and the regulation factors; and storing the correspondences and the reference measurement parameter.

Optionally, a measurement parameter includes a Time-ToTrigger.

The technical solutions provided by the embodiments of the present disclosure have the following beneficial effects.

In the embodiments of the present disclosure, the target parameter is acquired, the target parameter is a parameter varying with the altitude and configurable to indicate the altitude of the aerial vehicle. The target measurement parameter for cell handover is determined according to the target parameter. Cell handover processing is performed according to the target measurement parameter. In such a manner, the drone may have different measurement parameters at different altitudes. Based on values set in the correspondences, the drone may have a relatively long measurement parameter at a high altitude, and thus cannot perform frequent cell handover, thereby reducing a failure rate of data transmission.

Those of ordinary skill in the art should know that all or a part of the steps for implementing the abovementioned embodiments may be implemented through hardware, and may also be implemented by instructing related hardware by a program. The program may be stored in a computer-readable storage medium. The storage medium may be a ROM, a magnetic disk, an optical disc or the like.

The foregoing is only one embodiment of the present disclosure and not intended to limit the present disclosure. Any modifications, equivalent replacements, improvements and the like made within the spirit and principle of the present disclosure shall fall within the scope of protection of the present disclosure.

The invention claimed is:

1. A method for managing a measurement parameter for cell handover, performed by an aerial vehicle and comprising:
   acquiring, by the aerial vehicle, a target parameter in a flight process, the target parameter being a parameter varying with an altitude and configurable to indicate an altitude of the aerial vehicle;
   determining, by the aerial vehicle, a target measurement parameter for cell handover according to the target parameter; and
   performing, by the aerial vehicle, cell handover processing according to the target measurement parameter;
   wherein determining, by the aerial vehicle, the target measurement parameter for cell handover according to the target parameter comprises:
   determining, by the aerial vehicle, a target regulation factor corresponding to the currently-acquired target parameter according to pre-stored correspondences between target parameters and regulation factors; and
   acquiring, by the aerial vehicle, a product of the target regulation factor and a pre-stored reference measurement parameter for cell handover to obtain the target measurement parameter for cell handover;
   wherein the target parameter comprises:
   a parameter on an altitude value;
   a parameter on a number of detected cells other than a presently-accessed cell;
   a parameter on a number of detected cells, other than the presently-accessed cell and neighbor cells of the presently-accessed cell; and
   a parameter on an increase speed of a number of detected cells.

2. The method of claim 1, further comprising:
   receiving, by the aerial vehicle, a first notification message sent by a base station, the first notification message being used to instruct the aerial vehicle to detect the target parameter.

3. The method of claim 1, further comprising:
   receiving, by the aerial vehicle, a second notification message sent by the base station, the second notification message containing the reference measurement parameter and the correspondences between the target parameters and the regulation factors; and
   storing, by the aerial vehicle, the correspondences and the reference measurement parameter.

4. The method of claim 1, wherein the measurement parameter comprises a TimeToTrigger.

5. An aerial vehicle implementing the method of claim 1, wherein the aerial vehicle is configured to have different measurement parameters at different altitudes, and have a longer Time To Trigger when flying at a higher altitude, to thereby avoid frequent cell handover, thereby reducing failure rate of data transmission.

6. An aerial vehicle, comprising:
   a processor; and
   memory having at least one instruction stored thereon, wherein the processor is configured to:
   acquire a target parameter in a flight process, the target parameter being a parameter varying with an altitude and configurable to indicate an altitude of the aerial vehicle;
   determine a target measurement parameter for cell handover according to the target parameter; and
   perform cell handover processing according to the target measurement parameter;
   wherein the processor is further configured to:
   determine a target regulation factor corresponding to the currently-acquired target parameter according to pre-stored correspondences between target parameters and regulation factors; and
   acquire a product of the target regulation factor and a pre-stored reference measurement parameter for cell handover to obtain the target measurement parameter for cell handover;
   wherein the target parameter comprises:
   a parameter on an altitude value;
   a parameter on a number of detected cells other than a presently-accessed cell;
   a parameter on a number of detected cells, other than the presently-accessed cell and neighbor cells of the presently-accessed cell; and
   a parameter on an increase speed of a number of detected cells.

7. The aerial vehicle of claim 6, wherein the processor is further configured to:
   receive a first notification message sent by a base station, the first notification message being used to instruct the aerial vehicle to detect the target parameter.

8. The aerial vehicle of claim 6, wherein the processor is further configured to:
   receive a second notification message sent by the base station, the second notification message containing the reference measurement parameter and the correspondences between the target parameters and the regulation factors; and
   store the correspondences and the reference measurement parameter.

9. The aerial vehicle of claim 6, wherein the measurement parameter comprises a TimeToTrigger.

10. A non-transitory computer-readable storage medium having at least one instruction stored thereon, wherein the instruction is loaded and executed by a processor to implement a method for managing the measurement parameter, the method comprising:
    acquiring a target parameter in a flight process, the target parameter being a parameter varying with an altitude and configurable to indicate an altitude of the aerial vehicle;
    determining a target measurement parameter for cell handover according to the target parameter; and performing cell handover processing according to the target measurement parameter;

wherein determining the target measurement parameter for cell handover according to the target parameter comprises:

determining a target regulation factor corresponding to the currently-acquired target parameter according to pre-stored correspondences between target parameters and regulation factors; and acquiring a product of the target regulation factor and a pre-stored reference measurement parameter for cell handover to obtain the target measurement parameter for cell handover, wherein the targeted parameter comprises:

a parameter on an altitude value;

a parameter on a number of detected cells other than a presently-accessed cell;

a parameter on a number of detected cells, other than the presently-accessed cell and neighbor cells of the presently-accessed cell; and a parameter on an increase speed of a number of detected cells.

11. The non-transitory computer-readable storage medium of claim 10, wherein the instruction is loaded and executed by the processor to implement the method for managing the measurement parameter for cell handover, the method further comprises:

receiving a first notification message sent by a base station, the first notification message being used to instruct the aerial vehicle to detect the target parameter.

12. The non-transitory computer-readable storage medium of claim 10, wherein the instruction is loaded and executed by the processor to implement the method for managing the measurement parameter for cell handover, the method further comprises:

receiving a second notification message sent by the base station, the second notification message containing the reference measurement parameter and the correspondences between the target parameters and the regulation factors; and storing the correspondences and the reference measurement parameter.

13. The non-transitory computer-readable storage medium of claim 10, wherein the measurement parameter comprises a TimeToTrigger.

* * * * *